(12) United States Patent
Holton

(10) Patent No.: US 6,608,669 B2
(45) Date of Patent: Aug. 19, 2003

(54) QUADRATURE PROCESSED LIDAR SYSTEM

(75) Inventor: Carvel E. Holton, Blacksburg, VA (US)

(73) Assignee: Virginia Tech Intellectual Properties, Blacksburg, VA (US)

(*) Notice: Subject to any disclaimer, the term of this patent is extended or adjusted under 35 U.S.C. 154(b) by 0 days.

(21) Appl. No.: 09/956,634

(22) Filed: Sep. 20, 2001

(65) Prior Publication Data

US 2002/0105632 A1 Aug. 8, 2002

Related U.S. Application Data

(60) Provisional application No. 60/234,367, filed on Sep. 22, 2000.

(51) Int. Cl.[7] .............................. G01P 3/36; G01C 3/08
(52) U.S. Cl. ..................... 356/28.5; 356/5.09; 356/5.15
(58) Field of Search ............................. 356/28.5, 4.01, 356/5.09, 5.15; 342/84, 99, 104

(56) References Cited

U.S. PATENT DOCUMENTS

| | | | |
|---|---|---|---|
| 4,340,299 A | * 7/1982 | Mongeon | 356/28.5 |
| 4,445,118 A | 4/1984 | Taylor et al. | 343/357 |
| 5,475,776 A | 12/1995 | Jenkins et al. | 385/28 |

(List continued on next page.)

OTHER PUBLICATIONS

M.J. Parker, C. Holton, "Design for a Comprehensive Optical Atmospberic Monitoring System", 11th Joint Conference on the Applications of Air Pollution Meteorology, American Meteorological Society/ Air and Waste Management Association, Long Beach, CA Jan. 2000.

(List continued on next page.)

Primary Examiner—Stephen C. Buczinski
(74) Attorney, Agent, or Firm—Cantor Colburn, LLP (57) ABSTRACT

A method of generating in-quadrature signals is disclosed. The method comprises phase shifting a Doppler frequency-shifted signal; phase shifting a local oscillator signal; mixing the phase shifted Doppler frequency-shifted signal and the phase-shifted local oscillator signal generating thereby a signal which includes the phase-shifted Doppler frequency-shifted signal and a further phase-shifted local oscillator signal; and mixing the unphase-shifted Doppler frequency-shifted signal and the unphase-shifted local oscillator signal generating thereby a signal which includes the unphase-shifted local oscillator signal and a further phase-shifted Doppler frequency-shifted signal. A method of determining the velocity of an object is also disclosed. The method comprises receiving a Doppler frequency-shifted signal reflected or backscattered from the object; generating a local oscillator signal; based upon the received Doppler frequency-shifted signal and the local oscillator signal, generating an in-phase signal; based upon the received Doppler frequency-shifted signal and the local oscillator signal generating an in-quadrature signal; summing the in-phase signal and the in-quadrature signal; and transforming the summation of the in-phase signal and the in-quadrature signal. A lidar is disclosed comprising an optical system for transmitting an output signal to an object and receiving thereby a Doppler frequency-shifted signal reflected or backscattered from the object; a signal mixing assembly receptive of the Doppler frequency-shifted signal and a local oscillator signal generating thereby an in-phase signal and an in-quadrature signal; and a signal transformer for transforming the in-phase signal and an in-quadrature signals. A signal mixing system is disclosed comprising an array of signal couplers receptive of a Doppler frequency-shifted signal and a local oscillator signal generating thereby an in-phase signal which includes the unphase-shifted local oscillator signal and a phase-shifted Doppler frequency-shifted signal and an in-quadrature signal which includes the phase-shifted Doppler frequency-shifted signal and a further phase-shifted local oscillator signal; and a plurality of signal detectors receptive of the in-phase and in-quadrature signals.

30 Claims, 5 Drawing Sheets

U.S. PATENT DOCUMENTS 5,835,199 A * 11/1998 Phillips et al. .............. 356/5.03
5,847,817 A * 12/1998 Zediker et al. ............ 356/5.09
6,325,172 B1 * 12/2001 Langridge et al.
6,327,039 B1 * 12/2001 de Groot et al.
6,388,739 B1 * 5/2002 Rice .......................... 356/28.5

OTHER PUBLICATIONS

C. Holton, M.J. Parker, SPIE Proceedings, "Fiber Optics in Meteorological Instrumentation Suites", vol. 3860–13, Sep. 1999 pp. 131–142.

F.J. Arregui, Y. Liu, K. Lenahan, C. Holton, I.R. Matias, R.O.Claus, SPIE Proceedings, "Optical Fiber Humidity Sensor Formed by the Ionic Self–Assembly Monolayer Process", vol. 3670, Mar. 1999.

F.J. Arregui, I.R. Matias, Y. Liu, K. Lenahan, R.O. Claus, "Optical Fiber Nanofabry–Perot Formed by the Ionic Self––Assembly Monolayer Process",Sensors and Actuators B, Chemical, Dec. 1998.

F.J. Arregui, Y. Liu, K. Lenahan, C. Holton, I.R. Matias, R.O. Claus, "Optical Fiber Humidity Sensor Formed by the Ionic Self–Assembly Monolayer Process", Optical Fibers Sensors Conference, Komju Korea, Apr. 1999.

C. Holton, P. Rogers, L. Beex, S. Sankaran, "Development and Testing of a Multi–Function Optical Fiber Lidar", 12th Annual Research Program, Apr. 1999.

G.A. Ball, G. Hull–Allen, C. Holton, G. Hull–A.llen, W.W.Morey "60 mW 1.5. um Single–Frequency Low–Noise Fiber Laser MOPA", Photonics Technology Letters, Feb. 1994.

G.A. Ball, C. Holton, W.W. Morey,"Low Noise Single Frequency Linear Fibre Laser", Electronic Letters, vol. 29, No. 18, Sep. 1993.

Prototype Handbook, Optical Air Data System (OADS), Reports, Proposals, UTOS, 1987–1989.

R. Frehlich, S.M. Hannon, S.W. Henderson, Applied Optics, Coherent Doppler LIDAR Measurements of Winds in the WEK Signal Regime, vol. 36, No. 15, May 1997.

* cited by examiner

QUADRATURE PROCESSED LIDAR SYSTEM

RELATED APPLICATIONS

This application claims the benefit of U.S. Provisional Patent Application No. 60/234,367, filed Sep. 22, 2000, which is incorporated herein as if set forth at length.

TECHNICAL FIELD

This disclosure relates to quadrature signal processing of local oscillator and Doppler frequency-shifted signals in a lidar or other coherent optical systems.

BACKGROUND

A primary obstacle of fiber lidar is assumed to be the birefringent depolarization of the local oscillator (LO) signal from the transmitted carrier after splitting from the lidar output path. The effect can destroy the heterodyne efficiency at the detector and hence lidar operation unless polarization preserving fiber is utilized in the system past the split point in homodyne systems. This effect is assumed worse in heterodyne systems utilizing different LO and transmitter sources. The only form of the optical fiber lidar "immune" from this effect utilizes a local oscillator signal taken from the Fresnel reflection at the end of the transmit fiber immediately preceeding the output telescope. However, this latter mode of operation is not required as conventionally assumed. Laboratory tests have shown that phonon modulation of the birefringence in the local oscillator path gives rise to AM modulation of the detected signals within the dynamic range required of the lidar to perform its basic task. This provides a statistically detectable signal.

Furthermore, in conventional lidar systems, a frequency offset between a local oscillator signal and a transmitted beam has been traditionally required. This has traditionally been achieved in homodyne operation via a frequency shifting device such as an expensive acousto-optic (A/O) modulator, or in heterodyne operation by maintaining a fixed offset between the frequencies of the two coherent sources. It is desirable to perform such heterodyning or homodyning without the use of such acousto-optic modulators.

SUMMARY OF THE INVENTION

The disclosed invention can be used in free-space lidar systems, fiber lidar systems, and other systems based upon coherent mixing to eliminate the costly A/O cell used for offset homodyne operation or the difficult to stabilize offset heterodyne source. These elements are replaced with inexpensive detectors and couplers with savings of several thousands of dollars. The use of the disclosed invention allows the effective use of non-polarized or polarization preserving fibers, depending on the coherent system design requirements. The disclosed invention can be utilized effectively in the presence of birefringent de-polarization.

Signal to noise ratio for the disclosed technique is within 3 dB of that engendered by the use of the typical A/O cell, but alignment and temperature sensitivities are considerably reduced. Further, the bandwidth requirements necessary in the processing electronics are cut in half relative to the A/O modulator or offset heterodyne systems. Lastly, the electronic support components required for the other system forms are eliminated with considerable savings in volume and electronic power. The use of multiple coherent wavelengths can be achieved with this disclosed invention The disclosed technique enables considerably more compact systems to be fabricated and cost effectively extends the applicability of the typical fiber lidar into a wider range of applications that require fall signed Doppler spectrum (vector velocity). Typical applications that will see substantial benefit include vibration sensing, turbulence sensing and velocity lidars (e.g. police radar applications, relative motion sensing applications, optical air data systems, etc.) of any type (e.g. linear velocity, tangential velocity, spin sensing, etc.)

DETAILED DESCRIPTION OF THE INVENTION

Applications for coherent Doppler lidars include velocity sensing applications (platforms and objects), volumetric/fluidic flow sensing, vibration monitoring, range to target and other related standoff sensing applications. The lidar detects the Doppler frequency shift imposed on coherent light scattered from a moving target by mixing the scattered, frequency shifted light with a reference beam of light (local oscillator) which is not shifted in frequency on the detector. A difference frequency results from this mixing process which is proportional to the velocity of the scattering medium. It is the Doppler frequency shift imposed on the light scattered from the target that provides the mechanism used for velocity detection. The reference beam can be either derived from the transmit beam (homodyne operation) or derived from another stable coherent source (heterodyne operation). By measuring the Doppler shift from three (or more) spatially separated lidar beams a complete vector velocity can be computed along with statistical velocity information.

Figure 1:
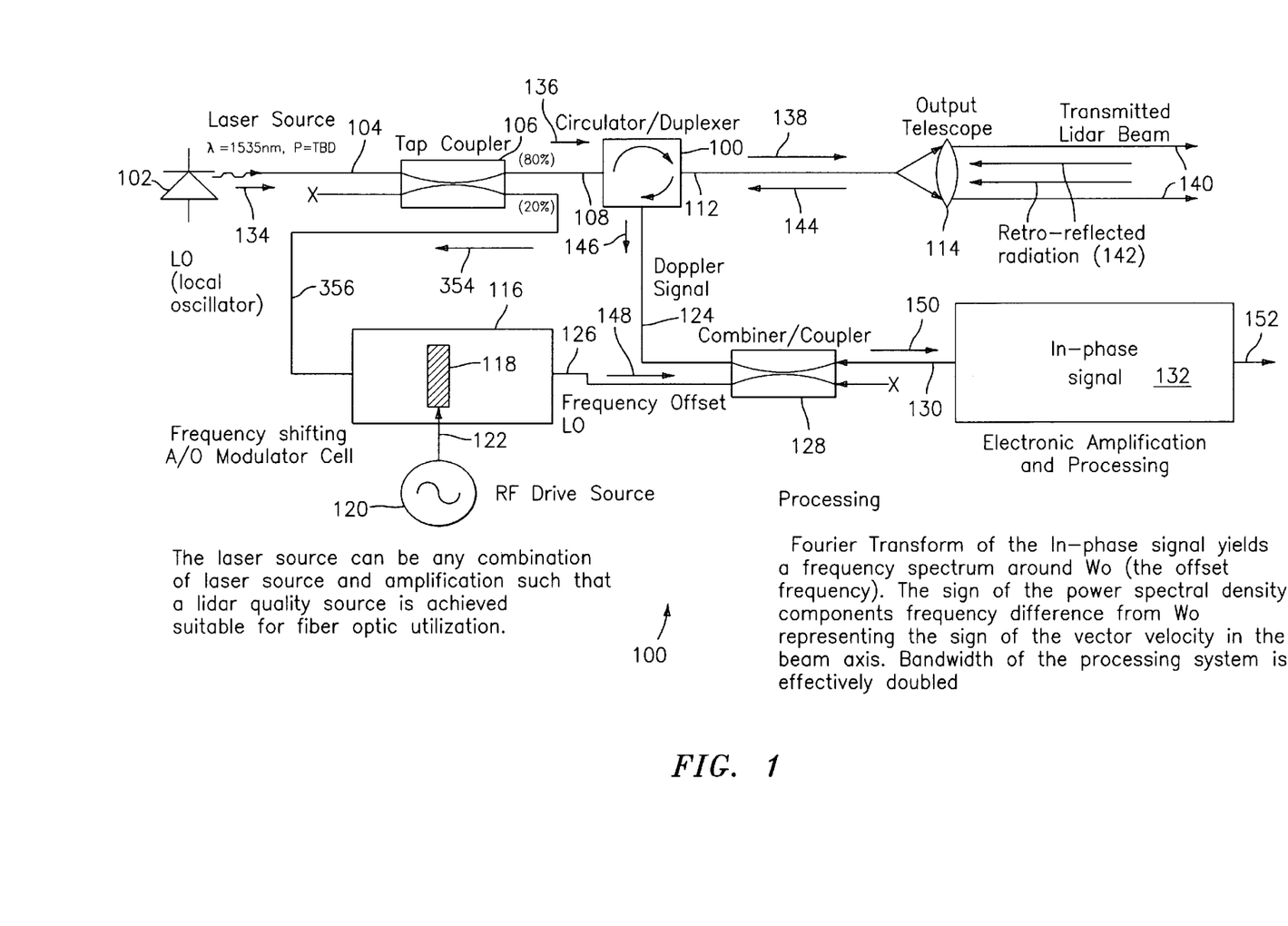
FIG. 1 is a schematic representation of an optical fiber lidar using an acousto-optical modulator.

In general, fiber lidar systems utilize the same optical functions to perform the lidar mission, except the optical elements are created by guided-wave optics (i.e. optical fiber devices). The laser source is generally a combination of a suitable solid state, DFB laser diode and one or more cascaded optical fiber amplifiers of the appropriate wavelength, although fiber or free-space lasers could be used as the source elements. For the most part, the amplifier of choice is the erbium-doped fiber amplifier (EDFA) operating at a wavelength of 1.54 μm. In one embodiment of an offset homodyne fiber lidar 100 shown in FIG. 1, the output 134 of the laser amplifier/source combination 102 is fed through a duplex element 110 to the end of a fiber 112 located at the focal point of an appropriate lens 114. In FIG. 1, the local oscillator (LO) signal 346, is split off by a tap coupler 106 prior to the duplex element 110 to be offset shifted in frequency by the A/O modulator 118, 120, 122. The frequency shifted LO signal 148 is then recombined with the returning Doppler signal 146 in a combining coupler 128 as shown in FIG. 1. The main beam 140 is transmitted to the target (not shown), such as atmospheric scatterers, through the lens 114 which also couples the backscattered light 142 into the return fiber path 144 through the duplex element 110. The two signals 146, 148 then mix due to the superposition of the electric field vectors on the detector 128 to generate a signal 150 at the Doppler difference frequency according to the square of the electric field intensity. Electronic processing of the signal 150 is then used to produce a Doppler velocity spectrum 152. The offset frequency must be greater than the highest Doppler velocity component. System electronic bandwidth must be twice this frequency to accept both positive and negative Doppler velocity.

Figure 2:
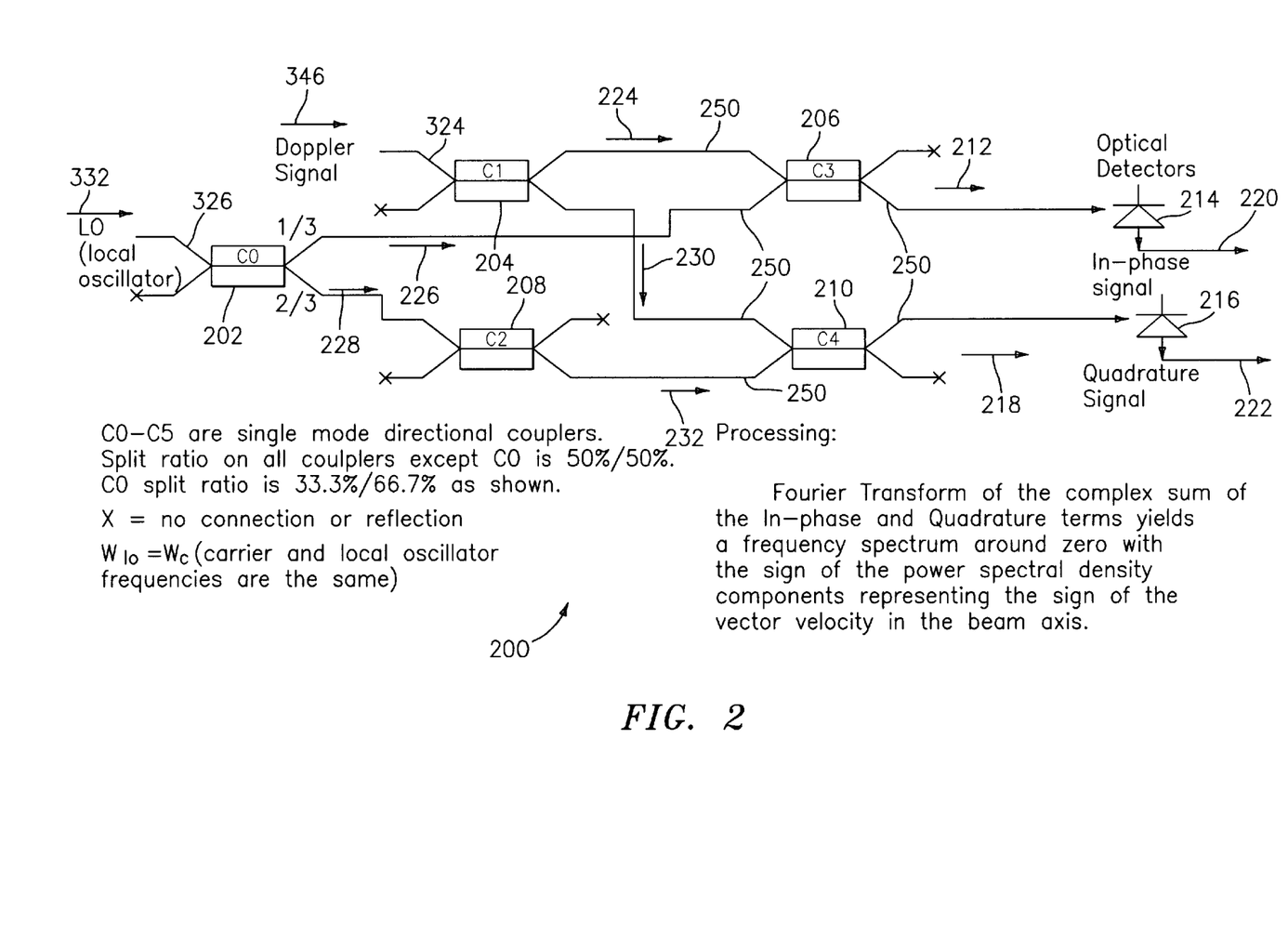
FIG. 2 is a schematic representation of a quadrature signal mixing assembly for bi-directional Doppler signal processing.
Figure 3:
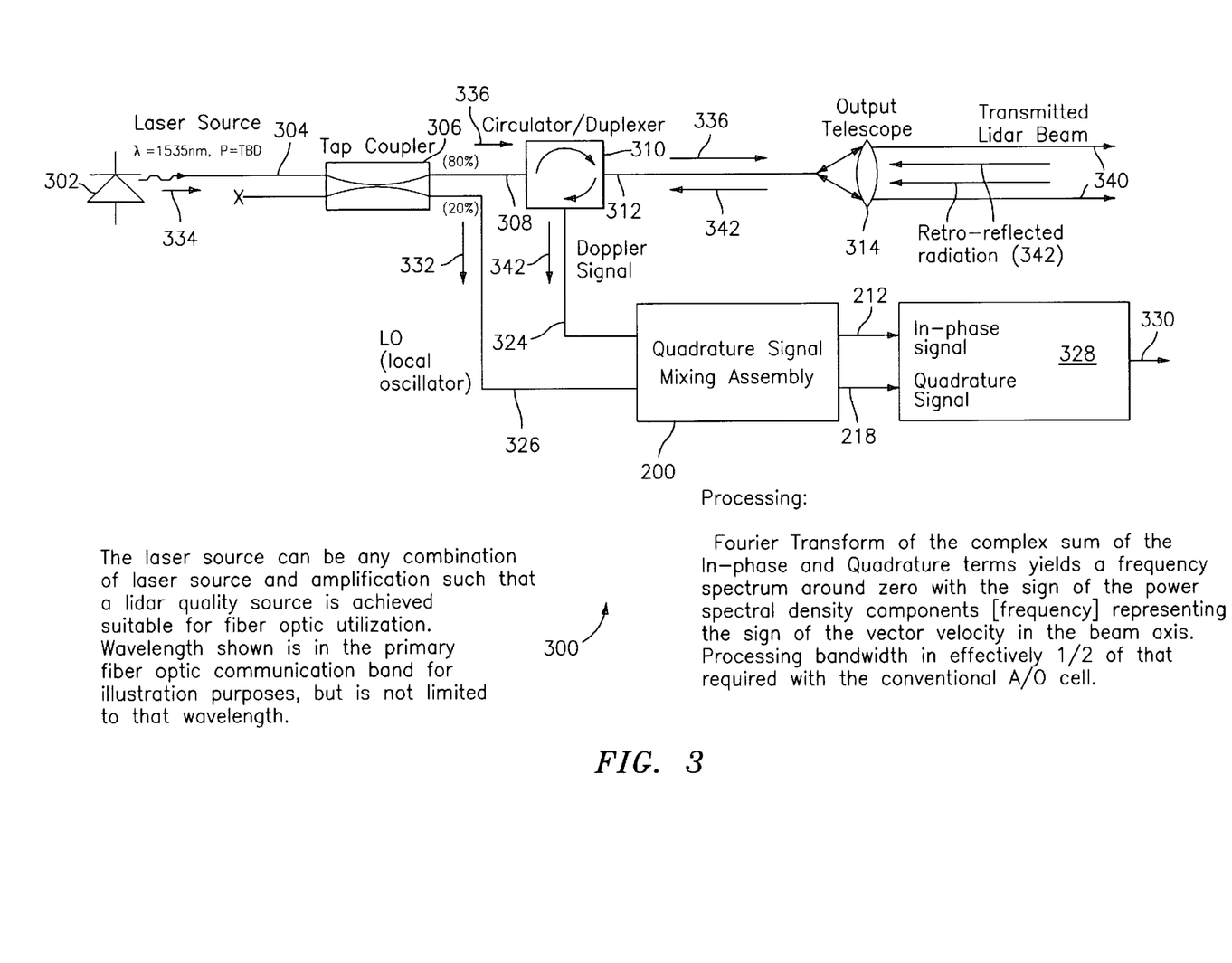
FIG. 3 is a schematic representation of a quadrature processed optical fiber lidar.

If the optical fiber quadrature processing assembly 200 shown in FIG. 2 is substituted for the combiner 128 shown in FIG. 1 and the system diagram modified as shown in FIG. 3, the A/O modulator 118, 120, 122 may be omitted and the system electronic bandwidth cut in half due to the effective use of the phase information in the optical carrier 134, 138, 140. The signals when processed according to the equations below result in a Fourier power spectrum centered around zero frequency instead of being centered around the offset frequency of the A/O modulator as in the case of FIG. 1. Such a network may also be used in coherent optical fiber systems (e.g., communications, sensors) operating over a wide range of wavelengths or may be used with free-space lidars with the appropriate optical coupling elements. In, FIG. 2, the fixed −90 degree phase shift of the couplers 202, 204, 206, 208, 210 is inherent in the coupled mode equations that describe the physics of the devices. These couplers 202, 204, 206, 208, 210 may then be used in mixing polarized or non-polarized optical sources at the optical detectors 214, 216 to generate the quadrature Doppler components. Those in-quadrature signal components may then be processed as the analytic function for the Fourier transform $(\sin(\pm\omega_d)t - j\cos(\pm\omega_d)t)$ to develop a signed velocity spectrum. While the equations below are used in RF spectrum analysis and are standard in communications textbooks for illustrating Fourier transform theory, heretofore it has not been connected to optical lidar signal processing using the phase characteristics of the coupled—mode equation.

Signals in a single mode, directional optical fiber coupler (fused, integrated optics, etc.) have a −90° phase shift in a transferred evanescent wave arm relative to the "straight through" fiber path due to the requirements of the wave equations for coupled waveguide solutions. This fact can be used as to develop in-quadrature signals for the spectrum analysis process that resolves the Doppler frequency and directional ambiguity in a Doppler based LIDAR (fiber or free-space based) used for velocity measurements. A shift in frequency is imposed on the transmitted light beam of a LIDAR (lidar) by the velocity of any object from which the light is reflected (i.e. the Doppler effect). However, a velocity magnitude toward or away from the lidar beam will generate the same differential frequency in the standard heterodyne process. This "directional ambiguity" must be resolved from the sign change in the axial vector velocity (i.e. change of velocity direction along a given axis) by use of the absolute frequency of the optical wave, by use of an offset frequency or via phase information relative to the carrier. The absolute carrier frequency is too high to work with in the electronic domain and the use of an offset frequency via an expensive acousto-optic cell (or other frequency shifting device), though conventionally used, is not to be preferred. The disclosed technique therefore develops the required information from the phase domain of signals.

The Doppler frequency shift in a lidar is related to the velocity according to the equation:

$$\omega_d = \frac{-4\pi V}{\lambda_s} (\text{rad/sec}) \tag{1a}$$

or $$f_d = \frac{-2V}{\lambda_s} (\text{Hz}) \tag{1b}$$

where V is the target velocity in meters per second and $\lambda_s$ is the laser source wavelength in the medium.

The network or array of signal couplers 200 illustrated in FIG. 2 is one combination of couplers that may comprise the in-quadrature signal processing network. The phase shifts for the signals are as illustrated for the various signals based on progression through the network. For the current discussion, the amplitude or splitting ratios are all assumed to be ½ (−3 dB couplers for $C_1$ through $C_4$) except for coupler $C_0$ (⅓–⅔). These split ratios allow the relative amplitude factors at the detectors to be assigned to unity for ease of computation. The coupling ratios may be significantly changed without significant change in the phase of the coupled wave arms in order to decrease the loss to the signal channel. This means that the loss in signal to noise ratio from this technique relative to a conventional single phase optical fiber system is no more than the 3 dB associated with coupler $C_1$. This loss is somewhat offset in the later signal processing. Loss in the local oscillator channel can be overcome simply by using more local oscillator power internal to the lidar. These considerations allow the network to operate over a very large dynamic range. In FIG. 2, the electric field (E) amplitudes of the signals delivered by the coupler array 200 to the first optical detector 214 is:

$$E_1 = -E_s \cos[(\omega_c \pm \omega_d)t] + E_{lo} \sin(\omega_{lo})t \tag{2}$$

where $E_s$ and $E_{lo}$ are the vector magnitudes of the signal and local oscillator field strengths respectively, $\omega_c$ is the radian frequency of the transmitted optical carrier beam and $\omega_d$ is the radian frequency of the Doppler shift imposed on the light by moving target. The sign of $\omega_d$ is dependent on the direction of the velocity vector and is positive if the target is moving toward the beam (or lidar) and negative if it is moving away from the beam (or lidar). In general, $\omega_d$ is a spectrum of frequencies with a bandwidth determined by the target velocity, surface figure, etc. Similarly, $\omega_c$ and $\omega_{lo}$ likewise have a finite bandwidth that is dependent on the laser source(s) being used in the lidar. For the purposes of the current development, $\omega_d$, $\omega_c$, and $\omega_{lo}$ may be assumed to be radian frequencies of zero bandwidth. The total signal content after processing is then simply the sum of the power spectral densities of each signal's bandwidth after mixing in the optical detectors. Likewise, at the second optical detector, 216:

$$E_2 = -E_s \cos[(\omega_c \pm \omega_d)t] + E_{lo} \cos(\omega_{lo})t \tag{3}$$

The detected signal currents are proportional to the power in the field and therefore, proportional to the square of the total field vector on each detector 214, 216. This fact is what causes the frequencies on the detectors to mix or "heterodyne." It is assumed that the polarizations of $E_s$ and $E_{lo}$ have been adjusted to achieve linear addition of the field vectors (essentially a heterodyne efficiency of unity). This is usually achieved by the use of polarization preserving waveguide structures, but birefringent structures associated with normal optical fiber guides will work well under most conditions where some compromise in signal to noise ratio may be offset with temporal averaging of the results. Returning to the signal current, under the given assumptions the intensity of the signals detected is, for example at the first detector 214:

$$I_s \: |E_1|^2 \quad (4)$$

Therefore, working with detector 214, the in-phase signal is:

$$I_P \: |E_s|^2 \cos^2[(\omega_c \pm \omega_d)t] + |E_{lo}|^2 \sin(\omega_{lo}t) - 2|E_s||E_{lo}|\cos[(\omega_c \pm \omega_d)t] \sin(\omega_{lo})t \quad (5)$$

The first two terms in proportionality (5) comprise the DC current term in the equation, which are removed by filters in the processing system 328 (FIG. 3) as only the AC terms carry the Doppler information required. Given that the proportionality is a simple liner algebraic constant, the proportionality can be assumed to be an equality for the present purposes and later scaled as appropriate to the absolute magnitudes if absolute signal strength is required. Therefore, using the appropriate trigonometric identity, $$I_p = -2|E_s||E_{lo}|\left[\frac{1}{2}\sin(\omega_c \pm \omega_d + \omega_{lo})t - \frac{1}{2}\sin(\omega_c \pm \omega_d - \omega_{lo})t\right] \quad (6)$$

In equation (6) $\omega_d$ is very small in comparison to $\omega_c$ or $\omega_{lo}$ and the average radian frequencies of these two terms are essentially equal as they are derived by splitting a single laser source (homodyne operation), i.e. $\omega_{lo} = \omega_c$. If these two terms are derived from separate sources (heterodyne operation), the theory of the calculations will not change, however the measured Doppler frequency will deviate from the assumed condition by an offset equal to the frequency difference between the carrier and local oscillator laser frequencies ($\omega_d = \omega_{d,true} + \omega_{offset}$). This issue can be ignored in the current calculations as the offset can be later added to the result. Therefore, provided sufficient coherence length is available in the laser source(s) such that $\omega_{lo}(t) = \omega_c(t)$, the sum frequencies are absorbed by the detector material as loss, leaving $$I_P = +E_s E_{lo} \sin(\pm \omega_d)t \quad (7)$$

Similarly, the signal current in detector 216, the in-quadrature signal, may be calculated as:

$$I_Q \propto -2|E_s||E_{lo}|\cos[(\omega_c \pm \omega_d)t]\cos(\omega_{lo})t = \quad (8)$$
$$-E_s E_{lo} \cos(\pm \omega_d)t$$

It can be seen from equations (7) and (8) that the two Doppler, photo signal currents are separated by 90 degrees in phase and are therefore in-quadrature. To process the Doppler velocity then the signals are summed and the complex Fourier Transform is taken as follows:

$$F(\omega) = E_s E_{lo} \int_{-\infty}^{+\infty} [\sin(\pm \omega_d)t - j\cos(\pm \omega_d)t]\exp\{-j\omega t\}dt \quad (9)$$

Using Euler's identity: $\exp\{\pm jX\} = \sin(x) \pm j\cos(x)$, then:

$$F(\omega) = \frac{\lim}{a/2 \to \infty} E_s E_{lo} \int_{-a/2}^{+a/2} \exp\{-j(\pm\omega_d)t\}\exp\{-j\omega t\}dt \quad (10)$$
$$= \frac{\lim}{a/2 \to \infty} E_s E_{lo} \int_{-a/2}^{+a/2} \exp\{-j(\omega \pm \omega_d)t\}dt$$
$$= \frac{\lim}{a/2 \to \infty} \frac{E_s E_{lo}}{-j(\omega \pm \omega_d)} \exp\{-j(\omega \pm \omega_d)t\}\Big|_{-a/2}^{a/2}$$
$$= \frac{\lim}{a/2 \to \infty} \frac{E_s E_{lo}}{-j(\omega \pm \omega_d)a/2} \exp\{-j(\omega \pm \omega_d)t\}\Big|_{-a/2}^{a/2}$$
$$= \frac{\lim}{a/2 \to \infty} \frac{E_s E_{lo}}{-j(\omega \pm \omega_d)a/2} j2\sin[(\omega \pm \omega_d)]a/2 \quad (11)$$

Mathematically, equation (11) then describes a frequency magnitude spectrum that is a zero bandwidth delta function with magnitude proportional to the product of $E_s E_{lo}$ and a power spectral density proportional to $|E_s E_{lo}|^2$ at a radian frequency of $\omega = +\omega_d$ or $-\omega_d$ according to the vector direction of the target moving toward or away from the lidar respectively. The final equation is then:

$$F(\omega) = 2\pi E_s E_{lo} \delta(\omega \pm \omega_d) \quad (12)$$

As was previously noted, if a finite bandwidth is associated with the laser source, local oscillator and/or target motion, the delta function of equation (12) is repeated over a power spectral density function whose width is equal to the sum of source bandwidth, local oscillator bandwidth and any additional bandwidth resulting from the target modulation effects. The center frequency of the distribution however, is still $\omega_d$ and its sign is either positive or negative in accordance with the direction of the Doppler shift. Thus analysis of the Fourier spectrum computed from the quadrature signals and equation (11) will yield both the magnitude spectrum of the Doppler signals (which may be further processed for velocity magnitude according to the equations 1a or 1b) and the sign of the velocity vector (inherent in the positive or negative sign of the frequency in the Fourier plane).

Figure 6:
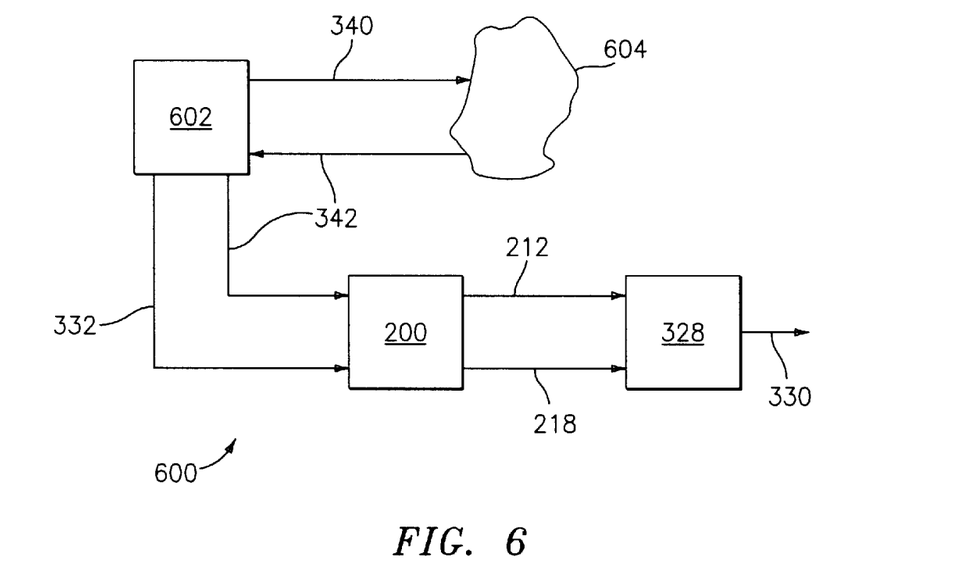
FIG. 6 is a schematic block diagram of a lidar system.

Referring to FIG. 6, a schematic block diagram of a lidar system is shown generally at 600. In FIG. 6, an optical system 602 directs an output signal 340 to an object 604 from which the output signal 340 is reflected or backscattered as a Doppler frequency-shifted signal 342. The optical system 602 accepts the Doppler frequency-shifted signal 342 and provides as output a local oscillator signal 332 and the Doppler frequency-shifted signal 346. A quadrature signal mixing assembly 200 accepts as input the Doppler frequency-shifted signal 346 and the local oscillator signal 332 and provides as output an in-phase and an in-quadrature signal 212, 218 for signal processing at 328 from which the velocity of the object may be determined.

Referring to FIG. 3, one embodiment of the lidar system of FIG. 6 is generally shown at 300. In FIG. 3, a radiation source, such as a laser 302, generates an output signal 334 at a prescribed wavelength, $\lambda$, such as 1535 nm. This wavelength is in the primary fiber optic communications band but is not limited to that wavelength. The laser source 302 can be any combination of laser source and amplification such that a lidar quality source is achieved suitable for fiber optic utilization. The output signal 334 is introduced into a waveguide 304, 308, 312 such as an optical fiber. The waveguide includes a coupler 306 which divides the output signal 334 into a local oscillator signal 332 and a partial component 336 of the output signal 334. The partial component 336 is provided to a circulator or duplexer 310 along waveguide section 308. The circulator or duplexer 310 provides the partial component 336 of the output signal 334 to waveguide section 312 from which it is launched, via telescope 314, to the object (not shown) as a transmitted lidar beam 340. The transmitted beam 340 encounters the object and is reflected or backscattered therefrom as a Doppler frequency-shifted signal 342. The Doppler frequency-shifted signal 342 retraces its path and is collected by the telescope 314 and introduced into waveguide section 312. The circulator or duplexer 310 directs the Doppler frequency-shifted signal 342, along with the local oscillator signal 332, to a quadrature signal mixing assembly 200. The quadrature signal mixing assembly 200 provides as output an in-phase and an in-quadrature signal 212, 218 for signal processing at 328 from which the velocity of the object may be determined.

Referring to FIG. 2 a quadrature signal mixing assembly is shown generally at 200. The quadrature signal mixing assembly 200 comprises an array or network of single mode directional couplers 202, 204, 206, 208, 210 interconnected by various waveguides generally designated by the reference numeral 250. A first signal coupler 202 is receptive of the local oscillator signal 324 of FIG. 3 at waveguide 326. The first signal coupler 202 provides as output two signals 226, 228. The first output signal 226 of the first signal coupler 202 is an unphase-shifted local oscillator signal. The second output signal 228 of the first signal coupler 202 is the local oscillator signal phase-shifted by −90 degrees. The ratio of the amplitudes of the first and second output signals 226, 228 of the first signal coupler 202 is 2 to 1. The local oscillator signal phase-shifted by −90 degrees 228 is provided as input to a second signal coupler 208, which in turn provides as output one signal 232. This output signal 232 is the local oscillator signal again phase-shifted by −90 degrees resulting in an output signal which is the local oscillator signal phase-shifted by a total of −180 degrees and reduced in amplitude to equal signal 226.

In FIG. 2, a third signal coupler 204 is receptive of the Doppler frequency-shifted signal 346 of FIG. 3 at waveguide 324. The third signal coupler 204 provides as output two signals 224, 230. The first output signal 224 of the third signal coupler 204 is an unphase-shifted Doppler frequency-shifted signal. The second output signal 230 of the third signal coupler 204 is the Doppler frequency-shifted signal phase-shifted by −90 degrees. A fourth signal coupler 210 is receptive of the −180 phase-shifted local oscillator signal 232 and the −90 degree phase-shifted Doppler frequency-shifted signal 230. The −180 phase-shifted local oscillator signal 232 and the −90 degree phase-shifted Doppler frequency-shifted signal are mixed in the fourth signal coupler 210 and the twice phase-shifted local oscillator signal is again phase-shifted by −90 degrees. The fourth signal coupler 210 provides as output an in-quadrature signal 218 which includes the phase-shifted Doppler frequency-shifted signal 230 and the further phase-shifted local oscillator signal 232.

A fifth signal coupler 206 is receptive of the unphase-shifted Doppler frequency-shifted signal 224 and the unphase-shifted local oscillator signal 226. The unphase-shifted Doppler frequency-shifted signal 224 and the unphase-shifted local oscillator signal 226 are mixed in the fifth signal coupler 206 and the unphase-shifted Doppler frequency-shifted signal 224 is phase-shifted by −90 degrees. The fifth signal coupler 206 provides as output an in-phase signal 212 which includes the unphase-shifted local oscillator signal 226 and the −90 degree phase-shifted Doppler frequency-shifted signal.

The in-phase signal 212 and the in-quadrature signal 218 are provided as input to optical detectors 214, 216 which provide as output electrical signals 220, 222 indicative of the intensities, $I_P$ and $I_Q$, of the in-phase and in-quadrature signals 220, 222. Fourier transforming the complex sum of the in-phase and in-quadrature signals yields a frequency spectrum centered around zero with the sign of the power spectral density components representing the sign of the vector velocity in the lidar beam 140 axis. The processing bandwidth is effectively one half of that which is required using a conventional A/O cell.

This method and apparatus can be achieved in the electronic domain under conditions in which tracking the Doppler frequency through zero velocity (zero frequency) is not necessary, i.e. a velocity scenario in which the Doppler frequency is unipolar and sufficiently displaced from zero at all times. However, the dynamic range and simplicity of the optical system disclosed is superior under all conditions and is therefore to be preferred under most circumstances supported by the photonics of the lidar itself. It should also be noted that this technique can be implemented in free-space optics with optical analogs (beam splitters and waveplates) to the fused waveguide couplers originally intended and to a limited degree in multi-mode optical waveguides. In this regard, it has not been obvious to the user community that the phase shift of the waveguide coupler may be used in manner disclosed.

Figure 4:
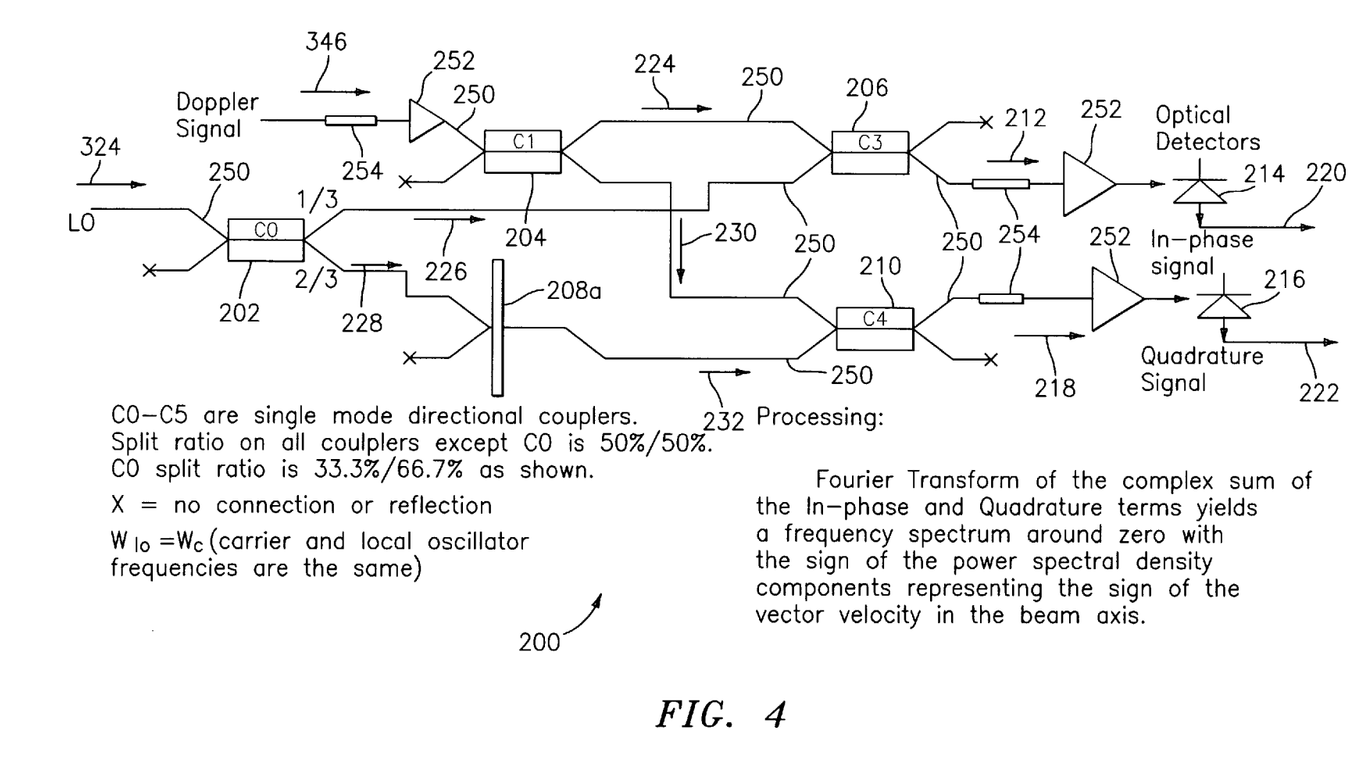
FIG. 4 is a schematic representation of a quadrature signal mixing assembly for bi-directional Doppler signal processing utilizing quarter wave retarders and signal amplifiers.
Figure 5:
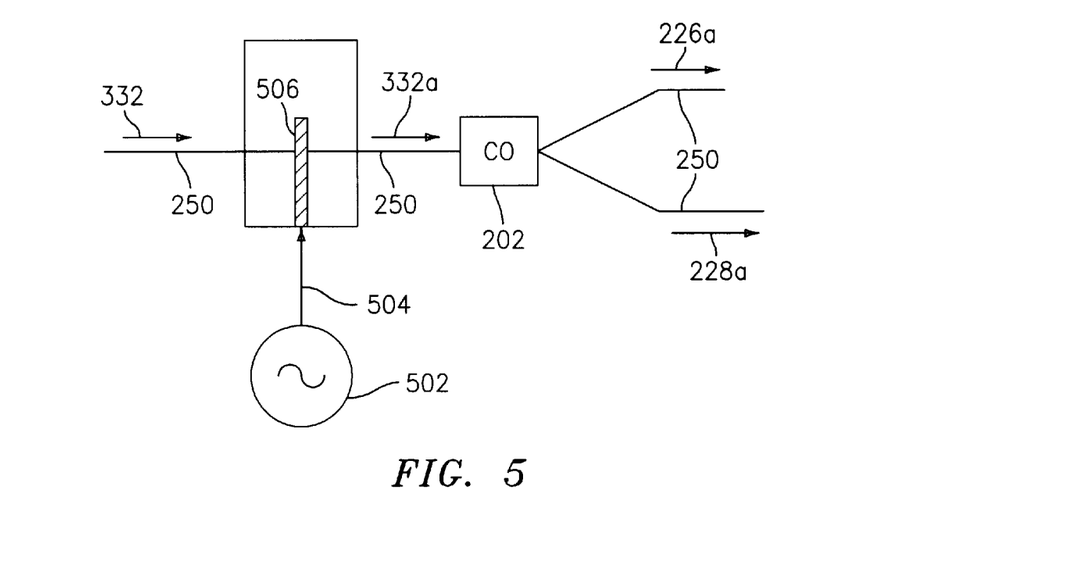
FIG. 5 is a schematic representation of a frequency offset local oscillator signal in the quadrature signal mixing assembly of FIG. 2.

In the case of polarized fiber systems, coupler 208 in FIG. 2 can be replaced with a ¼ wave retarder 208 a as seen in FIG. 4. Also, as seen in FIG. 5, the local oscillator signal 326 in FIG. 2 can be offset with either an A/O modulator 502, 504, 506 or a separate oscillator source to shift the frequency spectrum to any arbitrary frequency for use with other forms of processing (such as SAW spectrum analyzers), if sufficient benefit would accrue to such a return to the offset components. Free-space component analogs exist for utilization of the same technique in free-space lidars, but the alignment difficulty engendered in using such a scheme would have to be offset by integrated optical or precision alignment techniques.

Also shown in FIG. 4, another degree of freedom available to this system allows the use of an optical fiber amplifier 252 in the output legs of couplers 206 and 210 or the input leg of coupler 204 to restore signal to noise ratio lost due to the attenuation of the couplers. Such amplifiers can be back pumped to achieve isolation of the pump bands from the signal bands. Alternately, the individual couplers may be potentially combined with wavelength division multiplexers to both pump and split in a single efficient component.

Thus, based upon the foregoing description, a quadrature processed lidar system is disclosed with application general coherent optical systems. While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. A method of generating in-quadrature signals, the method comprising:

receiving a Doppler frequency-shifted signal;

phase shifting the Doppler frequency-shifted signal generating thereby a phase-shifted Doppler frequency-shifted signal and an unphase-shifted Doppler frequency-shifted signal;

receiving a local oscillator signal;

phase shifting the local oscillator signal generating thereby a phase-shifted local oscillator signal and an unphase-shifted local oscillator signal;

further phase shifting the local oscillator signal;

mixing the phase-shifted Doppler frequency-shifted signal and the further phase-shifted local oscillator signal generating thereby a signal that includes the phase-shifted Doppler frequency-shifted signal and the further phase-shifted local oscillator signal; and mixing the unphase-shifted Doppler frequency-shifted signal and the unphase-shifted local oscillator signal generating thereby a signal that includes the unphase-shifted local oscillator signal and the phase-shifted Doppler frequency shifted signal.

2. A method of determining the sign of the velocity vector associated with the velocity of an object, the method comprising:

receiving a Doppler frequency-shifted signal reflected or backscattered from the object;

generating a local oscillator signal;

based upon the received Doppler frequency-shifted signal and the local oscillator signal, generating an in-phase signal;

based upon the received Doppler frequency-shifted signal and the local oscillator signal, generating an in-quadrature signal;

summing the in-phase signal and the in-quadrature signal;

Fourier transforming the summation of the in-phase signal and the in-quadrature signal; and yielding a power spectral density from the Fourier transform representative of the sign of the velocity vector.

3. A lidar comprising:

an optical system for transmitting an output signal to an object and receiving thereby a Doppler frequency-shifted signal reflected or backscattered from the object; wherein the optical system comprises:

a laser generating a laser beam at a prescribed wavelength, a signal coupler receptive of the laser beam and adapted to divide the laser beam into a local oscillator signal and a coupler output signal, a circulator receptive of the coupler output signal and adapted to provide a circulator output signal to the object, to receive the Doppler frequency-shifted signal from the object, and to output the Doppler frequency-shifted signal, and a telescope receptive of the circulator output signal and adapted to direct the circulator output signal to the object and to receive the Doppler frequency-shifted signal from the object, wherein the circulator is adapted to receive the Doppler frequency-shifted signal from the telescope;

a signal mixing assembly including:

a plurality of signal phase shifting devices being adapted to receive the Doppler frequency-shifted signal from the circulator and a local oscillator signal from the signal coupler, and being adapted to generate an in-phase signal, said in-phase signal including an unphase-shifted local oscillator signal, and an in-quadrature signal, said in-quadrature signal including a phase-shifted Doppler frequency-shifted signal and a further phase-shifted local oscillator signal, the signal mixing assembly including a waveguide system adapted to guide the laser beam, the local oscillator signal, the various output signals and the Doppler frequency-shifted signal therealong; and a signal processing system adapted to Fourier transform the in-phase and in-quadrature signals.

4. The signal mixing assembly as set forth in claim 3 wherein the plurality of signal phase shifting devices comprise a plurality of single mode directional couplers in signal communication by a plurality of waveguides.

5. The signal mixing assembly as set forth in claim 4 wherein the plurality of directional couplers comprise first, second, third, fourth and fifth directional couplers, and wherein;

the first directional coupler is adapted to receive the local oscillator signal and to generate an unphase-shifted local oscillator signal and a first phase-shifted local oscillator signal;

the second directional coupler is adapted to receive the first phase-shifted local oscillator signal and to generate a further phase-shifted local oscillator;

the third directional coupler is adapted to receive the Doppler frequency-shifted signal and to generate an unphase-shifted Doppler frequency-shifted signal and a phase-shifted Doppler frequency-shifted signal;

the fourth directional coupler is adapted to receive the phase-shifted Doppler frequency-shifted signal and the further phase-shifted local oscillator signal and to generate the in-quadrature signal; and the fifth directional coupler is adapted to receive the unphase-shifted Doppler frequency-shifted signal and the unphase-shifted local oscillator signal and to generate the in-phase signal.

6. The signal mixing assembly as set forth in claim 3 further comprising a plurality of signal detectors adapted to receive the in-phase and in-quadrature signals and adapted to generate output electrical signals indicative of the intensities of the in-phase and in-quadrature signals.

7. The lidar as set forth in claim 3 wherein the signal transformer comprises a Fourier transformer receptive of the in-phase signal and in-quadrature signal and operative thereby to Fourier transform the complex sum of the in-phase signal and in-quadrature signal.

8. The lidar as set forth in claim 3 further comprising a signal modulator adapted to receive the local oscillator signal and to shift the local oscillator signal to a prescribed frequency.

9. The lidar as set forth in claim 8 wherein the modulator comprises an acousto-optic modulator.

10. A signal mixing system comprising:

a plurality of signal couplers in signal communication by a plurality of waveguides being adapted to receive a Doppler frequency-shifted signal, a local oscillator signal, a phase-shifted Doppler frequency-shifted signal, a phase-shifted local oscillator signal, and a further phase-shifted local oscillator signal, and being adapted to generate an in-phase signal that includes an unphase-shifted local oscillator signal and the phase-shifted Doppler frequency-shifted signals, and an in-quadrature signal that includes the phase-shifted Doppler frequency-shifted signal and the further phase-shifted local oscillator signal; and a plurality of signal detectors adapted to receive the in-phase and in-quadrature signals.

11. A coherent optical system comprising:

an optical system for transmitting an output signal to an object and receiving thereby a Doppler frequency-shifted signal reflected or backscattered from the object;

a signal mixing assembly receptive of the Doppler frequency-shifted signal and a local oscillator signal generating thereby an in-phase signal and an in-quadrature signal, the signal mixing assembly comprising:
- a plurality of signal couplers adapted to receive a Doppler frequency-shifted signal, a local oscillator signal, a phase-shifted Doppler frequency-shifted signal, a phase-shifted local oscillator signal, and a further phase-shifted local oscillator signal, and adapted to generate the in-phase signal, said in-phase signal including an unphase-shifted local oscillator signal and the phase-shifted Doppler frequency-shifted signal, and the in-quadrature signal, said in-quadrature signal including the phase-shifted Doppler frequency-shifted signal and the further phase-shifted local oscillator signal, and
- a plurality of signal detectors adapted to receive the in-phase and in-quadrature signals; and a signal processing system adapted to Fourier transform the in-phase and in-quadrature signals.

12. A signal mixing system comprising:

an array of signal phase shifting devices adapted to receive a Doppler frequency-shifted signal and a local oscillator signal, and adapted to generate thereby:
- an in-phase signal that includes an unphase shifted local oscillator signal and a phase shifted Doppler frequency-shifted signal; and
- an in-quadrature signal that includes the phase shifted Doppler frequency-shifted signal and a further phase-shifted local oscillator signal;

wherein the array of phase shifting devices comprise a plurality of single mode directional couplers in signal communication by a plurality of waveguides.

13. The signal mixing system as set forth in claim 12 wherein the array of signal phase shifting devices comprise a plurality of single mode directional couplers in signal communication by a plurality of waveguides.

14. The signal mixing system as set forth in claim 13 wherein the plurality of directional couplers comprise first, second, third, fourth and fifth directional couplers, and wherein:

the first directional coupler is adapted to receive the local oscillator signal and to generate an unphase-shifted local oscillator signal and a first phase-shifted local oscillator signal;

the second directional coupler is adapted to receive the first phase-shifted local oscillator signal and to generate a further phase-shifted local oscillator;

the third directional coupler is adapted to receive the Doppler frequency-shifted signal and to generate an unphase-shifted Doppler frequency-shifted signal and a phase-shifted Doppler frequency-shifted signal;

the fourth directional coupler is adapted to receive the phase-shifted Doppler frequency-shifted signal and the further phase-shifted local oscillator signal and to generate the in-quadrature signal; and the fifth directional coupler is adapted to receive the unphase-shifted Doppler frequency-shifted signal and the unphase-shifted local oscillator signal and to generate the in-phase signal.

15. The signal mixing system as set forth in claim 12 further comprising a plurality of signal detectors adapted to receive the in-phase and in-quadrature signals and adapted to generate output electrical signals indicative of the intensities of the in-phase and in-quadrature signals.

16. The signal mixing system as set forth in claim 14 wherein the phase-shifted local oscillator signal and the unphase-shifted local oscillator signal have an amplitude ratio of 2:1.

17. The signal mixing system as set forth in claim 14 wherein the second directional coupler comprises a quarter wave retarder.

18. The signal mixing system as set forth in claim 14 further comprising:

a first amplifier receptive of the Doppler frequency-shifted signal for amplification thereof;

a second amplifier receptive of the in-phase signal for the amplification thereof; and a third amplifier receptive of the in-quadrature signal for amplification thereof.

19. The signal mixing system as set forth in claim 18 wherein the first second and third amplifiers comprise rare earth doped fiber amplifers.

20. The signal mixing system as set forth in claim 14 further comprising:

a first isolator receptive of the Doppler frequency-shifted signal for isolation thereof;

a second isolator receptive of the in-phase signal for the isolation thereof; and a third isolator receptive of the in-quadrature signal for isolation thereof.

21. A method of generating in-phase and in-quadrature lidar signals, the method comprising:

phase-shifting the Doppler frequency-shifted signal to generate a phase-shifted Doppler frequency-shifted signal and an unphase-shifted Doppler frequency-shifted signal;

phase-shifting the local oscillator signal to generate a phase-shifted local oscillator signal and an unphase-shifted local oscillator signal;

further phase-shifting the phase-shifted local oscillator signal to generate a further phase-shifted local oscillator signal;

mixing the phase-shifted Doppler frequency-shifted signal and the further phase-shifted local oscillator signal generating thereby an in-quadrature signal that includes the phase-shifted Doppler frequency-shifted signal and the further phase-shifted local oscillator signal; and mixing the unphase-shifted Doppler frequency-shifted signal and the unphase-shifted local oscillator signal generating thereby an in-phase signal that includes the unphase-shifted local oscillator signal and the unphase-shifted Doppler frequency-shifted signal.

22. The method as set forth in claim 21 wherein phase shifting the Doppler frequency-shifted signal comprises phase shifting the Doppler frequency-shifted signal by ninety degrees.

23. The method as set forth in claim 21 wherein;

phase-shifting the local oscillator signal comprises phase-shifting the local oscillator signal by ninety degrees; and further phase-shifting the local oscillator signal comprises phase-shifting the local oscillator signal by one hundred and eighty degrees.

24. A method of determining the velocity of an object, the method comprising:

generating an output signal directed at the object;

receiving a Doppler frequency-shifted signal reflected or backscattered from the object;

generating a local oscillator signal;

based upon the received Doppler frequency-shifted signal and the local oscillator signal, generating an in-phase signal;

based upon the received Doppler frequency-shifted signal and the local oscillator signal, generating an in-quadrature signal;

summing the in-phase signal and the in-quadrature signal;

Fourier transforming the summation of the in-phase signal and the in-quadrature signal; and yielding a computational result from the Fourier transform representative of both the velocity magnitude and the velocity direction.

25. The method as set forth in claim 24 wherein Fourier transforming the summation of the in-phase signal and the in-quadrature signal comprises Fourier transforming the summation of the in-phase signal and the in-quadrature signal generating thereby a delta function in the frequency domain located at a radian Doppler shifted frequency of $+\omega_d$ for an object moving toward an observer and $-\omega_d$ for an object moving away from an observer, wherein $\omega_d$ is the Doppler shifted frequency.

26. The method as set forth in claim 25 wherein the velocity of the object is determined based upon the equation $\omega_d = -4\pi V/\lambda_s$, wherein $\omega_d$ is the Doppler shifted frequency, V is the velocity of the object, and $\lambda_s$ is the wavelength of the laser source.

27. The method as set forth in claim 24 wherein generating an in-phase signal comprises mixing the Doppler frequency-shifted signal and the local oscillator signal.

28. The method as set forth in claim 24 wherein generating an in-quadrature signal comprises:

phase-shifting the Doppler frequency-shifted signal;

phase-shifting the local oscillator signal;

further phase-shifting the local oscillator signal;

mixing the phase-shifted Doppler frequency-shifted signal and the further phase-shifted local oscillator signal generating thereby an in-quadrature signal that is ninety degrees out of phase with the in-phase signal.

29. The method as set forth in claim 28 wherein phase shifting the Doppler frequency-shifted signal comprises phase shifting the Doppler frequency-shifted signal by ninety degrees.

30. The method as set forth in claim 28 wherein further phase-shifting the local oscillator signal comprises phase-shifting the local oscillator signal by one hundred and eighty degrees.

\* \* \* \* \*